March 8, 1966     H. W. JOHNSON     3,238,836
DRILLING REAMING WORK EXTRUDING SELF-TAPPING SCREW
Filed March 25, 1964     2 Sheets-Sheet 2

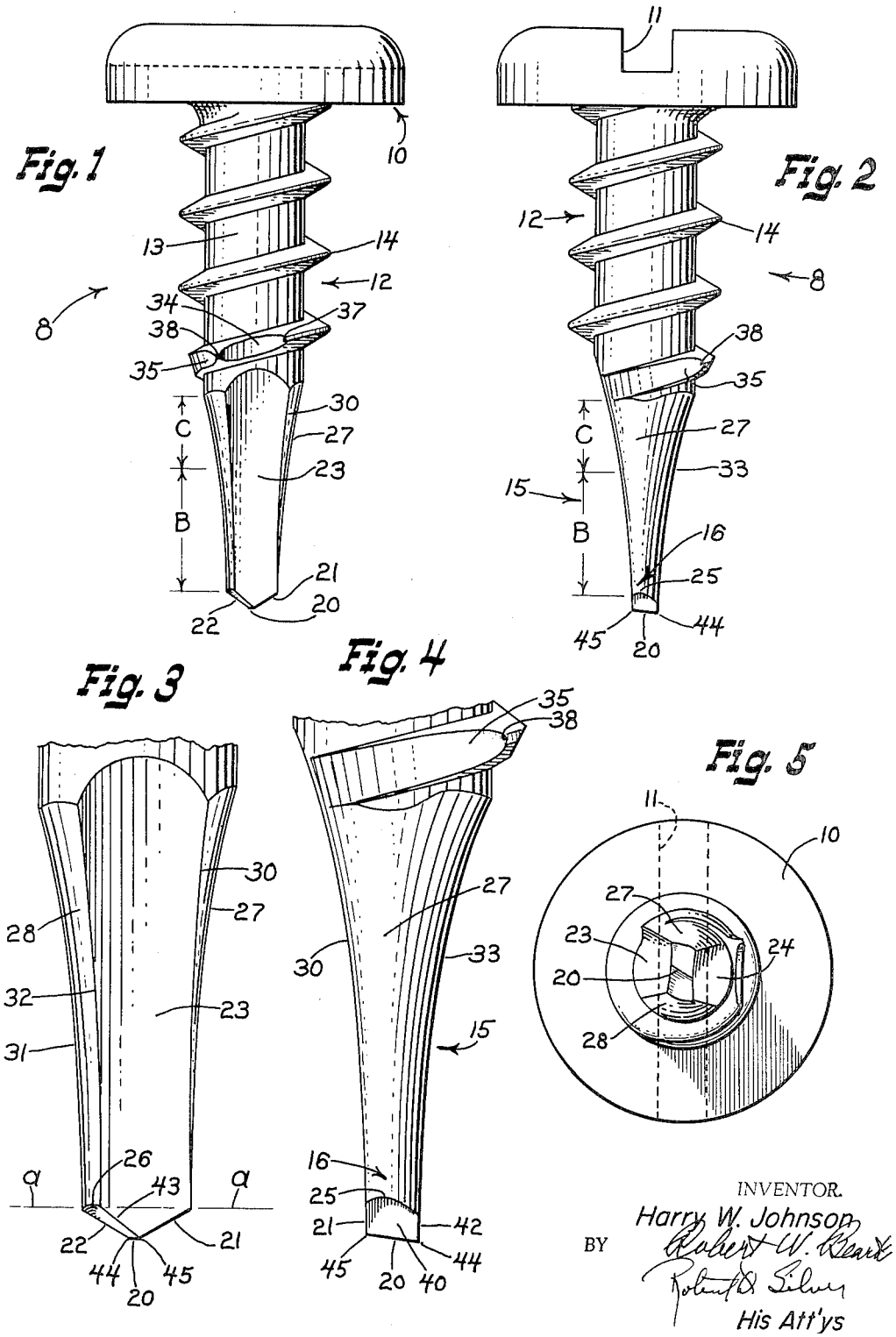

INVENTOR.
Harry W. Johnson
His Att'ys

United States Patent Office 3,238,836
Patented Mar. 8, 1966

3,238,836
DRILLING REAMING WORK EXTRUDING
SELF-TAPPING SCREW
Harry W. Johnson, West Chicago, Ill.
(2501 N. Keeler Ave., Chicago, Ill.)
Filed Mar. 25, 1964, Ser. No. 354,587
3 Claims. (Cl. 85—47)

This invention relates in general to screws which are of the drilling, reaming, and tapping variety and more particularly relates to screws of this type which are particularly useful in connection with self-drilling of sheet metal and the extrusion of a portion thereof in association with the reaming action to provide increased thread length during the tapping action of the screw.

Self-drilling screws, when used in conjunction with a power screw driver, have an advantage in that they do not require a pre-punching or pre-drilling of a hole in a workpiece such as sheet metal or the like. As is well known, large quantities of self-tapping screws are used for a wide variety of industrial uses. For example, in the home appliance field, sheet metal panels for the cabinets of refrigerators, automatic washers, dryers, dish washers, etc., are customarily fastened in place by means of self-tapping screws. Each self-tapping screw requires either a pre-punching operation during the manufacture of the sheet metal parts with the attendant problems of alignment when two parts are to be assembled at a later time or the necessity for a power drill or the like on the assembly "line" requiring an operator to drill the hole after two sheet metal parts are in aligned relationship. Some sheet metals, particularly those of relatively thin gauge, pose an additional problem in that the thickness of the metal is such that there is very little "stock" for the threads of the screws to engage after they have been formed by the self-tapping screw.

The instant screw is directed toward a self-drilling, reaming, metal extruding, self-tapping screw which eliminates the problems of either pre-punching or pre-drilling of the work panel.

An important object of the instant invention is the provision of a self-drilling, self-reaming, self-extruding, self-tapping screw which has a drilling point of special formation whereby the same does not walk, slip, or drift on starting, and which will penetrate a substantial distance without binding, and which has a relatively low driving force.

A further object of the invention is the provision of self-drilling and self-tapping screws of the above character when the length of the self-drilling point is approximately twice the root diameter of the threaded shank and wherein the self-drilling point is generally inwardly non-linearly tapered from the shank to a generally flattened tip, the width of which is approximately one fourth of the root diameter of the shank.

A still further object of the invention is the provision of a tip portion which may be characterized as having a relatively short initial drilling portion, and a relatively long drilling-reaming-extruding portion, the drilling portion being relatively small relative to the root diameter of the thread and the rate of change in the diameter of the tip area from the reduced diameter adjacent the tip to the root diameter of the shank being a much smaller change as compared to the change adjacent the shank whereby a constant pressure constant speed power screw driver applied to the screw will cause a complex reaming-extruding function after initial penetration to thereby elongate the metal adjacent the initially drilled aperture to thereby provide increased stock for thread engagement.

The novel features which are characteristic of the invention are set forth with particularity in the appended claims. The invention, both as to its organization and its operation, together with additional objects and advantages thereof will be best understood by the following description of a specific embodiment in conjunction with the accompanying drawings in which:

FIG. 1 is a side elevational view of a self-drilling, self-reaming, self-tapping screw which embodies the present invention;

FIG. 2 is a side elevational view similar to FIG. 1 rotated 90°;

FIG. 3 is an enlarged fragmentary view of the point portion of FIG. 1;

FIG. 4 is an enlarged fragmentary view of the point portion shown in FIG. 2;

FIG. 5 is a point end plan view of the screw shown in FIG. 1;

Figure 6:
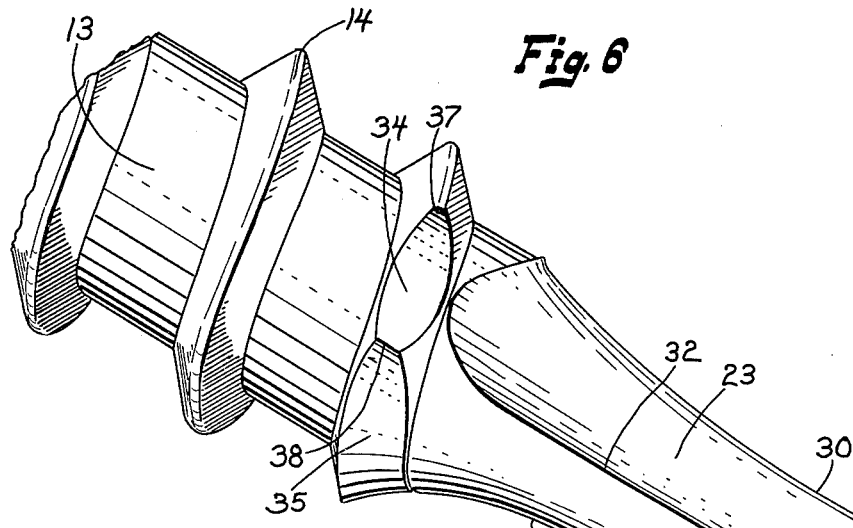
FIG. 6 is a perspective view of the point portion shown in FIGS. 1 and 2.

The self-drilling, self-reaming, self-tapping screw 8 is formed with a head means 10 of any suitable configuration and a shank means 12 depending therefrom. Head means 10 has torque imparting means here shown in the form of a kerf 11 which is engaged by a power screw driver or the like. It will be appreciated that various other forms of torque imparting means are contemplated and the illustrated form is to be considered illustrative rather than limiting.

The shank means 12 is threaded coextensive the length thereof having a root diameter 13 and thread diameter 14. A drilling, reaming, tip portion means 15 is at the entering end of the screw at the end opposite to the head portion 10. The thread may be one of several general types where it meets the tip portion means 15; i.e., it may be of little or no height where it joins the tip portion means or it may be a full thread which has upsets therein caused by the milling operation to provide the tip portions for reasons to be later explained. It will be further realized that while one particular type of thread form 14 is shown on the shank means 12, that any of many conventional threads may be used with the tip means 15 and the present invention is concerned mainly with the tip portion means 15 and its relationship or combination with the self-tapping portion of the screw and the method of manufacturing the same.

Figure 7:
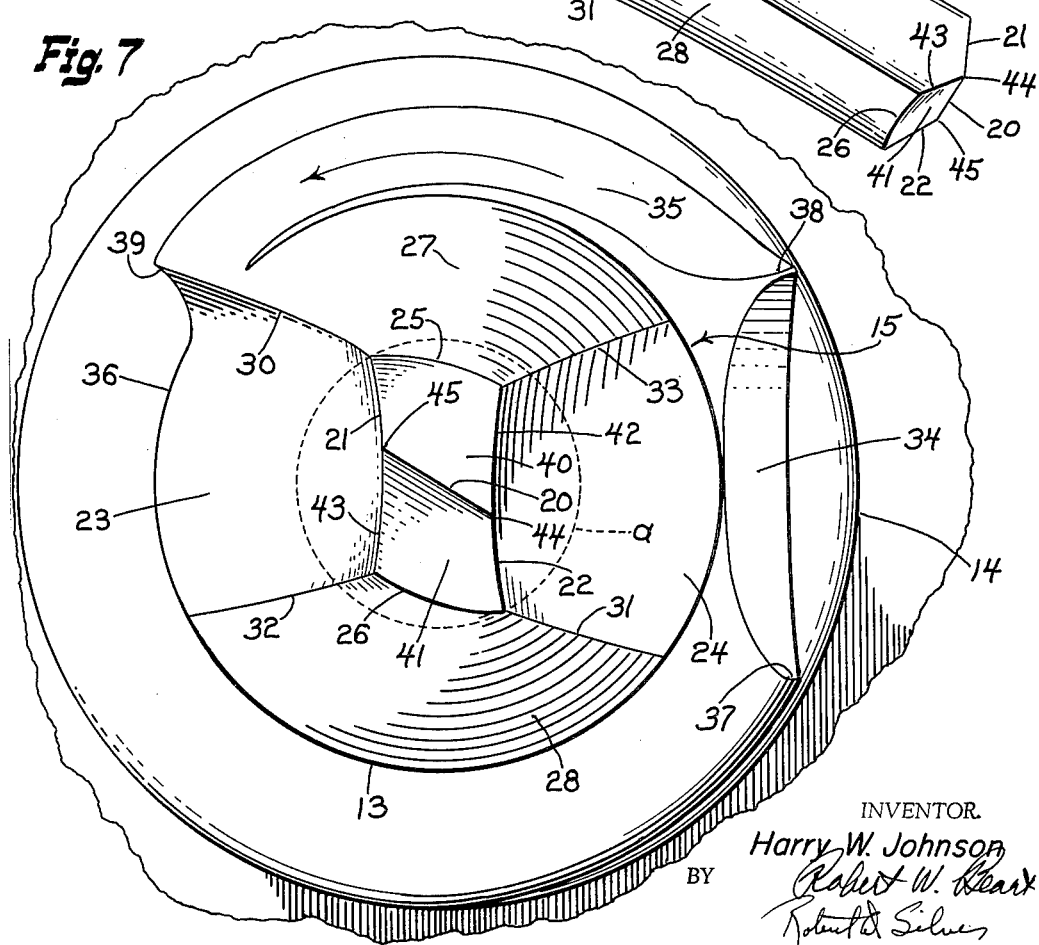
FIG. 7 is a greatly enlarged fragmentary view of a portion of FIG. 5.

The pointed end portion means 15 of the screw tapers inwardly from a maximum diameter substantially equal to the diameter of the root diameter 13 to define a terminus or point 16 of substantially smaller cross-section. In profile it can be seen that the inwardly tapered end portion 15 defines a gradual and concavely curved taper rather than a linear taper for reasons which will be discussed hereinafter. It will be further observed that the rate of change and angle of taper is much smaller in portion B of the tip means 15 as compared to portion C. The drilling tip portion 15 may be formed by cold heading or machining, the latter being preferred and on the leading end or terminus 16 of the end portion 15 comprises a semi-chisel edge 20, cutting edges 21 and 22 and fluted surfaces 23 and 24 extending toward the shank portion means 12, said surfaces 23 and 24 being concave in transverse section. The cutting edges 21 and 22 are relieved to the rear as at 25 and 26 (see FIGS. 3, 6, and 7). The broken line circle a which is shown in FIG. 7 to more clearly illustrate the relieving of the cutting edges 21 and 22, is taken at a transverse plane indicated by the broken line a—a of FIG. 3.

The longitudinally concave surfaces 27 and 28 extending from the terminus 16 toward the shank portion 12 between the fluted surfaces 23 and 24 are cutbacks in a transverse direction. A series of relatively sharp longitudinally extending concave edges are provided in the reaming portion of the tip means 15 at the intersections of the surfaces 23, 24, 27, and 28, more specifically edges 30, 31, 32, and 33, defined respectively by the intersections of surfaces 23 and 27, surfaces 24 and 28, surfaces 23 and 28, and surfaces 24 and 27.

The general form of the embodiment of the self-drilling, self-tapping screw described herein has been developed to provide a screw which has unique driving characteristics. In the illustrated screw 8, the tapered end portion means 15 is a little more than one half the length of the shank portion 13. The gently and concavely curved taper of the B portion of end portion 15 provides a minimum increase in the diameter thereof from the terminus 16 along the length of the end portion 15 and is particularly effective when the screw is used for assembling a plurality of layers of sheet metal together. Of particular interest is the fact that the taper of the tip portion is much more gradual adjacent the entering end at portion B, than it is at portion C adjacent the thread portion. Thus, when a power screw driver is used with constant speed and constant pressure, the drilling point, after cutting through the sheet metal, will experience a tendency to very rapidly move through the workpiece to afford a complex reaming extrusion tendency to simultaneously enlarge the hole and extrude the margins of the aperture being formed in the workpiece in the direction away from the screw head to thereby increase the amount of stock available for engagement by the thread cutting portion of the threads on the shank.

The upsets 34, 35, 36 on the lower-most thread provide sharp corners 37, 38, 39 which aid in the cutting and thread forming action that accrues when the threaded portion of the shank reaches the workpiece margins. These are provided at no additional cost in the manufacturing operation if the point means 15 is put on the shank subsequent to the thread rolling operation. These small notches 34, 35, 36 in the lower-most thread represent the places where the grinding wheels or circular milling cutters actually engage the lower-most thread during the formation of the point and thus do not require separate manufacturing operations. However, if the threads are rolled subsequential to forming the points these do not appear on the final product.

It has been found that the drill tip on the point 16 does not have a tendency to walk; i.e., to drift or to slip. The point area 16 is relatively small (it being appreciated that the drawings are on a greatly enlarged scale). The point area 16 comprises two flats 40 and 41 having a common edge 20. As is shown, edges 42 and 43 trail (in an axial direction) cutting edges 21 and 22. Further, point 45 trails point 44 very slightly, and thus point 44 is the first point which engages the workpiece. Thus, a very short portion of cutting edge 22 leads cutting edge 21. Point 44 is close to but slightly offset from the center of rotation which causes a fast starting action in the initial drilling.

Certain approximate ratios of the dimensions have been found to be desirable for this self-drilling point. In the illustrated form of the screw, the ratio of the length of the tapered end portion 15 to the root diameter 13 of the shank portion 12 is approximately 2:1 and the ratio of the width of the flattened tip of the end portion 15 to the root diameter of the shank portion 13 is approximately 1:4.

In use, the self-drilling, self-reaming, self-tapping screws may be readily driven by ordinary power tools through metal sheeting without any form of preparation.

Although a specific embodiment of the invention has been shown and described, it is with full awareness that many modifications thereof are possible. The invention, therefore, is not to be restricted except insofar as it is necessitated by the prior art and by the spirit of the appended claims.

What is claimed as the invention is:

1. In a self-drilling and self-tapping screw having a head and a substantially cylindrical shank having self-tapping threads formed thereon, the improvement which comprises a slender tapered self-drilling point having a length which is approximately equal to twice the root diameter of the threaded shank, said self-drilling point being characterized by four generally longitudinally extending surfaces a first pair of which are concavely curved in both a transverse as well as a longitudinal direction from the threaded shank inwardly toward the axis of the screw to form a pair of oppositely facing longitudinally disposed flute means, the second pair of said surfaces being concavely curved in a longitudinal direction and convexly curved relative to the axis of the screw in transverse section, a generally flattened tip portion having its smallest transverse measurement being approximately equal to one-fourth the root diameter of the threaded shank and with its largest transverse dimension being smaller than one-half the root diameter of the threaded shank, the intersecting longitudinal sides of said four surfaces defining four edges which are concavely curved in a longitudinal direction from the threaded shank inwardly toward said generally flattened tip so as to form progressively increased diameter reaming or cutting edges, said flattened tip further having a pair of oppositely disposed flats extending downwardly from the transversly convex surfaces and forming at their intersection a common edge or chisel point which lies in a plane slightly offset from a plane transverse to the axis of the shank to form a single point offset from the axis of the screw at its terminal end, the edges of said flats intersecting said flutes forming two cutting edges and two trailing edges.

2. A device of the type claimed in claim 1 wherein said reaming edges are two in number and diametrally oppositely disposed, said edges being disposed in such a fashion that they are preceded by the flute means and the transversely convex surfaces trailing said edges being circumferentially relieved.

3. A device of the type claimed in claim 2 wherein said flats are disposed at a compound angle relative to the axis whereby said flats form a diamond-like configuration when viewed in plan or end view, said common edge between said flats being in a plane slightly offset from a plane passing longitudinally through the centers of said flutes.

References Cited by the Examiner

UNITED STATES PATENTS

| | | | |
|---|---|---|---|
| 1,638,230 | 8/1927 | Alsaker | 85—47 |
| 2,136,458 | 11/1938 | Olson | 85—47 |
| 2,388,482 | 11/1945 | Haynes | 85—47 |
| 2,403,861 | 7/1946 | Klemm | 77—66 |
| 2,479,730 | 8/1949 | Dewar | 85—47 |
| 3,093,028 | 6/1963 | Mathie | 85—41 |

FOREIGN PATENTS

| | | |
|---|---|---|
| 1,008,781 | 2/1952 | France. |
| 1,268,396 | 6/1961 | France. |
| 690,269 | 4/1953 | Great Britain. |
| 50,995 | 1/1910 | Switzerland. |

CARL W. TOMLIN, *Primary Examiner.*

M. PARSONS, JR., *Assistant Examiner.*